(12) United States Patent
Karlsson et al.

(10) Patent No.: US 10,868,660 B2
(45) Date of Patent: Dec. 15, 2020

(54) FULL-DUPLEX ACTIVATION IN A WIRELESS COMMUNICATION SYSTEM

(71) Applicant: Sony Mobile Communications Inc., Tokyo (JP)

(72) Inventors: Peter Karlsson, Lund (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,554

(22) PCT Filed: Jan. 15, 2016

(86) PCT No.: PCT/EP2016/050768
§ 371 (c)(1),
(2) Date: Jul. 12, 2018

(87) PCT Pub. No.: WO2017/121487
PCT Pub. Date: Jul. 20, 2017

(65) Prior Publication Data
US 2019/0028260 A1 Jan. 24, 2019

(51) Int. Cl.
*H04L 5/14* (2006.01)
*H04B 17/318* (2015.01)
(Continued)

(52) U.S. Cl.
CPC ......... *H04L 5/1461* (2013.01); *H04B 17/318* (2015.01); *H04L 5/1423* (2013.01);
(Continued)

(58) Field of Classification Search
CPC ... H04L 5/0044; H04L 5/0096; H04L 5/1423; H04L 5/1461; H04B 17/318; H04W 24/08; H04W 4/70
See application file for complete search history.

(56) References Cited

U.S. PATENT DOCUMENTS

2011/0222445 A1* 9/2011 Alanara ............... H04W 36/06
370/281
2011/0314145 A1* 12/2011 Raleigh ............... H04L 41/0893
709/224
(Continued)

OTHER PUBLICATIONS

International Search Report and Written Opinion from corresponding International Application No. PCT/EP2016/050768, dated Sep. 9, 2016; 12 pages.
(Continued)

*Primary Examiner* — Jenee Holland
(74) *Attorney, Agent, or Firm* — Tucker Ellis LLP

(57) ABSTRACT

At least one condition associated with radio communication of a radio device (10-A, 10-B-, 10-C, 100) with a further radio device (10-A, 10-B-, 10-C, 100) is monitored. In response to the at least one condition being met, full-duplex operation is activated for the radio communication of the radio device (10-A, 10-B-, 10-C, 100) with the further radio device (10-A, 10-B-, 10-C, 100). The full-duplex operation comprises transmission of a first signal on a carrier frequency from the radio device (10-A, 10-B-, 10-C, 100) to the further radio device (10-A, 10-B-, 10-C, 100) and simultaneous transmission of a second signal on the same carrier frequency from the further radio device (10-A, 10-B-, 10-C, 100) to the radio device (10-A, 10-B-, 10-C, 100).

21 Claims, 5 Drawing Sheets

(51) Int. Cl.
*H04W 4/70* (2018.01)
*H04W 24/08* (2009.01)
*H04W 72/08* (2009.01)
*H04L 5/00* (2006.01)

(52) U.S. Cl.
CPC ............ *H04W 4/70* (2018.02); *H04W 24/08* (2013.01); *H04W 72/085* (2013.01); *H04L 5/0044* (2013.01); *H04L 5/0096* (2013.01)

(56) References Cited

U.S. PATENT DOCUMENTS

| | | | | |
|---|---|---|---|---|
| 2013/0315107 | A1* | 11/2013 | Lindner | H04L 65/4061 370/277 |
| 2014/0219449 | A1* | 8/2014 | Shattil | H04B 7/0456 380/270 |
| 2014/0221037 | A1* | 8/2014 | Hassett | H04W 52/245 455/522 |
| 2015/0382375 | A1 | 12/2015 | Bhushan | |
| 2016/0037322 | A1* | 2/2016 | Nguyen | H04W 8/005 370/329 |
| 2017/0033881 | A1* | 2/2017 | Wu | H04W 72/1231 |
| 2017/0257184 | A1* | 9/2017 | Stirling-Gallacher | H04W 52/241 |
| 2018/0007724 | A1* | 1/2018 | Kazmi | H04W 8/005 |

OTHER PUBLICATIONS

Tapio, Visa et al.: "DUPLO Deliverable D1.1 System Scenarios and Technical Requirements for Full-Duplex Concept", Duplo, May 2, 2013; Retrieved from internet URL: http://cordis.europa.eu/docs/projects/cnect/9/316369/080/deliverables/001-D11v10.pdf; 58 pages.

* cited by examiner

FULL-DUPLEX ACTIVATION IN A WIRELESS COMMUNICATION SYSTEM

FIELD OF THE INVENTION

The present invention relates to methods of controlling radio transmission in a wireless communication system and to corresponding devices.

BACKGROUND OF THE INVENTION

In wireless communication systems, it is known to utilize full-duplex operation or half-duplex operation. In the case of full-duplex operation, a radio device can transmit and receive at the same time, while in the case of half-duplex operation, the radio device may only either transmit or receive at a given time. Full-duplex operation modes are for example defined for the LTE radio technology specified by 3GPP. In the case of the full-duplex operation specified for the LTE radio technology, transmit radio signals and receive radio signals are separated in the frequency domain, i.e., different carrier frequencies are used for the transmit radio signals and the receive radio signals.

To further enhance capacity or performance, it was also suggested to use full-duplex operation on the same carrier frequency. Corresponding research is for example described in "Full-duplex Radios" by D. Bharadia et al., Proceedings of the ACM SIGCOMM 2013 conference on SIGCOMM (2013).

However, it was shown that utilization full-duplex operation on the same carrier frequency is subject to certain restrictions, so that it is typically not feasible to operate a large-scale wireless communication system entirely based on full-duplex operation on the same carrier frequency. For example, between certain radio devices full-duplex operation on the same carrier frequency may not be possible due to excessive interference between transmit signal and receive signal (also referred to as self-interference).

Accordingly, there is a need for techniques that allow for efficiently utilizing full-duplex operation on the same carrier frequency.

SUMMARY OF THE INVENTION

According to an embodiment of the invention, a method of controlling radio transmission in a wireless communication system is provided. The method involves monitoring at least one condition associated with radio communication of a radio device with a further radio device. In response to the at least one condition being met, full-duplex operation is activated for the radio communication of the radio device with the further radio device. The full-duplex operation comprises transmission of a first signal on a carrier frequency from the radio device to the further radio device and simultaneous transmission of a second signal on the same carrier frequency from the further radio device to the radio device.

According to an embodiment, the at least one condition is based on at least one of a transmit signal strength of the first signal at the radio device and a transmit signal strength of the second signal at the further radio device. More specifically, the at least one condition may be based on the transmit signal strength being below a threshold. For example, if the transmit signal strength is below the threshold, the full-duplex operation may be activated.

According to an embodiment, the at least one condition is based on at least one of a received signal strength of the second signal at the radio device and a received signal strength of the first signal at the further radio device.

More specifically, the at least one condition may be based on the received signal strength being above a threshold. For example, if the received signal strength is above the threshold, the full-duplex operation may be activated.

According to an embodiment, the at least one condition is based on a distance of the radio device to the further radio device. More specifically, the at least one condition may be based on the distance being below a threshold. For example, if the distance is below a threshold, the full-duplex operation may be activated.

Further, the at least one condition is based on motion of the radio device relative to the further radio device. For example, if motion of the radio device relative to the further radio device is within certain limits, e.g., if relative velocity is below a threshold, the full-duplex operation may be activated.

Further, the at least one condition may be based on a quality of service requirement for said radio communication of the radio device with the further radio device. For example, if a low quality of service class is assigned to the radio communication, the full-duplex operation may be activated.

Further, the at least one condition may be based on a traffic type associated with the radio communication of the radio device with the further radio device. For example, if the radio communication is used for conveying best effort traffic, the full-duplex operation may be activated.

Further, the at least one condition may be based on a bandwidth requirement associated with the radio communication of the radio device with the further radio device. For example, if there is a low bandwidth requirement, the full-duplex operation may be activated.

According to an embodiment, the method may also involve deactivating the full-duplex operation in response to the at least one condition not being met.

According to an embodiment, at least one of the radio device and the further radio device corresponds to a base station of a cellular radio network. For example, the radio device could correspond to a base station of a cellular radio network and the further radio device could correspond to a terminal device connected via the base station to the cellular radio network. Further, the radio device could correspond to a terminal device connected to a cellular radio network and the further radio device could correspond to a base station of the cellular radio network. Further, each of the radio device and the further radio device could correspond to a base station of a cellular radio network, e.g., in a scenario in which the radio communication is used for providing a backhaul link between the two base stations.

According to an embodiment, the monitoring of the at least one condition and activating of the full-duplex operation may be performed by the radio device. The process of activating of the full-duplex operation may then comprises that the radio device sends an indication of enablement of said full-duplex operation to the further radio device. The indication of enablement may correspond to an activation command which immediately triggers switching of the further radio device to the full to duplex operation. In other scenarios, the indication of enablement may also indicate that the further radio device is allowed to activate the full-duplex operation, e.g., based on evaluation of one or more further conditions by the further radio device. In some cases, activating of the full duplex operation may also be signalled implicitly by other control information, e.g., by scheduling information.

According to an embodiment, the monitoring and activating of the full-duplex operation may also be performed by a radio control node which is responsible for controlling radio communication of at least the radio device. In some scenarios, the radio control node may be responsible for controlling radio communication of both the radio device and the further radio device. For example, the radio control node could correspond to a base station of a cellular radio network, and the radio device and optionally also the further radio device could be connected via the base station to the cellular radio network. The process of activating of the full-duplex operation may then comprise that the radio control node sends an indication of enablement of said full-duplex operation to the radio device. The indication of enablement may correspond to an activation command which immediately triggers switching of the radio device to the full to duplex operation. In other scenarios, the indication of enablement may also indicate that the radio device is allowed to activate the full-duplex operation, e.g., based on evaluation of one or more further conditions by the further radio device.

According to a further embodiment of the invention, a radio device is provided. The radio device comprises a radio interface for communication with a further radio device. Further, the radio device comprises one or more processors configured to monitor at least one condition associated with radio communication of the radio device with a further radio device and, in response to the at least one condition being met, activate full-duplex operation for the radio communication of the radio device with the further radio device. The full-duplex operation comprises transmission of a first signal on a carrier frequency from the radio device to the further radio device and simultaneous transmission of a second signal on the same carrier frequency from the further radio device to the radio device. In particular, the processor(s) may be configured to perform steps of the above-described method.

According to a further embodiment of the invention, a radio control node is provided. The radio control node comprises a control interface for controlling radio communication of a radio device with a further radio device. Further, the radio control node comprises one or more processors configured to monitor at least one condition associated with radio communication of the radio device with a further radio device and, in response to the at least one condition being met, activate full-duplex operation for the radio communication of the radio device with the further radio device. The full-duplex operation comprises transmission of a first signal on a carrier frequency from the radio device to the further radio device and simultaneous transmission of a second signal on the same carrier frequency from the further radio device to the radio device. In particular, the processor(s) may be configured to perform steps of the above-described method.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to controlling radio transmission in a wireless communication system, specifically with respect to utilization of full-duplex operation on the same carrier frequency. In the illustrated examples, it is assumed that the wireless communication system is based on the LTE radio technology. However, it is to be understood that also other wireless communication technologies could be used in as an alternative or in addition, e.g., other cellular radio technologies or a WLAN (Wireless Local Area Network) technology.

Figure 1:
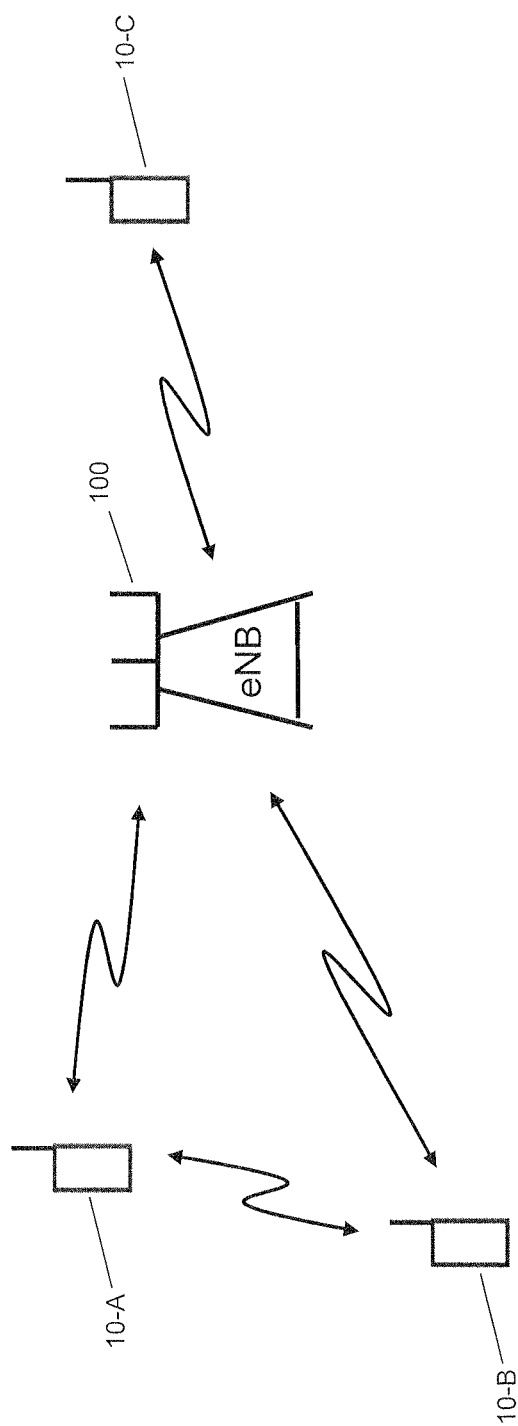
FIG. 1 schematically illustrates a mobile communication system according to an embodiment of the invention.

FIG. 1 schematically illustrates the wireless communication system. More specifically, FIG. 1 shows infrastructure of the mobile communication network in the form of a base station 100, in the LTE technology referred to as "eNB (evolved Node B)". Further, the one shows a group of UEs (user equipments) 10-A, 10-B, 10-C which are connected via the base station 100 to the mobile communication network. Accordingly, the base station 100 provides and controls access of the UEs 10-A, 10-B, 10-C to the mobile communication network. For example, the UEs 10-A, 10-B, 10-C may be connected to one or more cells served by the base station 100. Further, the wireless communication system may also support device-two-device (D2D) communication. By way of example, FIG. 1 illustrates D2D communication between the UEs 10-A and 10-B. A specific example of D2D communication would be V2V (vehicle-to-vehicle) communication between two vehicles. The D2D communication may be controlled by the base station 100. For example, the base station 100 could manage usage of cellular network radio resources for D2D communication. However, in some scenarios the D2D communication could also be organized in an autonomous manner by the involved radio devices, e.g., by the UEs 10-A and 10-B. The D2D communication may also be based on other radio technologies, such as a WLAN radio technology, a Bluetooth radio technology, or a VANET (Vehicular Ad Hoc Network) radio technology.

In the examples as further illustrated below, it is assumed that full-duplex operation on the same carrier frequency may be utilized for radio communication in the wireless communication system. Accordingly, a radio device, such as the base station 100 or one of the UEs 10-A, 10-B, or 10-C may simultaneously transmit and receive on the same carrier frequency. For example, the full-duplex operation could be utilized for radio communication of the UE 10-A with the base station 100, for radio communication of the UE 10-B with the base station 100, or for radio communication of the UE 10-C with the base station 100. Further, the full-duplex operation could be utilized for D2D radio communication of the UE 10-A with the UE 10-B.

Figure 2:
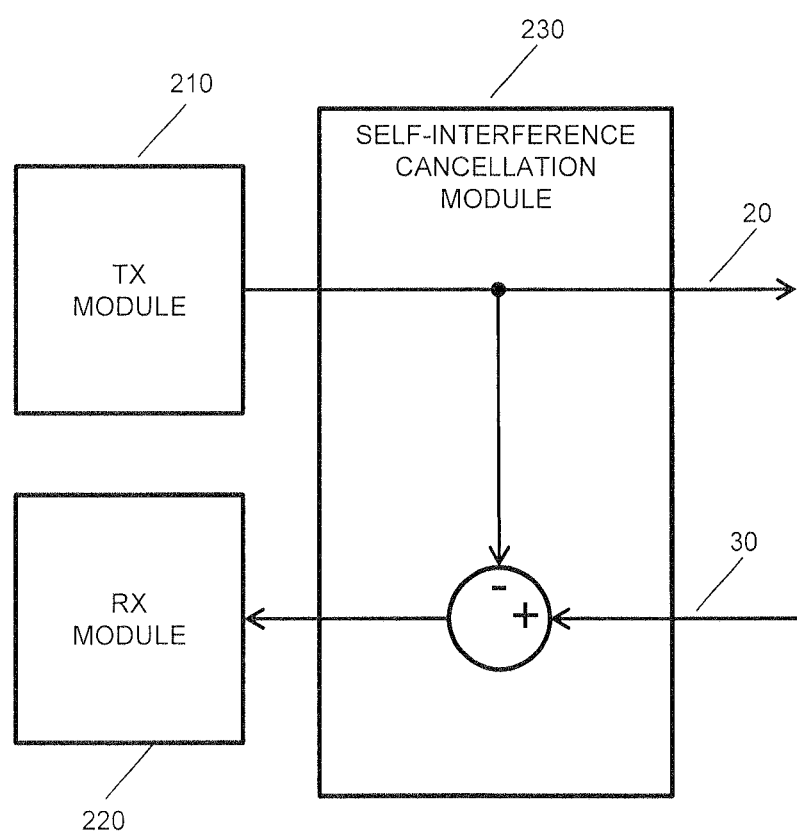
FIG. 2 schematically illustrates radio functionalities for implementing full-duplex operation according to embodiments of the invention.

FIG. 2 shows a block diagram for schematically illustrating radio functionalities which may be utilized for implementing the full-duplex operation on the same carrier frequency. Functionalities as illustrated in FIG. 2 may be implemented in each radio device involved in radio communication with full-duplex operation, e.g., in each of the UE's 10-A, 10-B, 10-C or in the base station 100.

The functionalities illustrated in fig to include a transmit (TX) module 210, a receive (RX) module 220, and a self-interference cancellation module 230. The TX module 210 is responsible for generating a first signal 20 which is transmitted to another radio device. The RX module 220 is responsible for receiving a second signal 30 from the other radio device. The first and second signals 20, 30 transmitted simultaneously and on the same carrier frequency. In this way, a highly efficient usage of radio resources is possible. Further, utilization of the full-duplex operation may offer low latency because the radio device may transmit and receive at the same time.

To avoid adverse effects arising from the simultaneous utilization of the same carrier frequency for those signals 20, 30, the self-interference cancellation module 230 is provided. As illustrated, the self-interference cancellation module 230 may operate by subtracting the first signal 20 from the second signal 30. In this way, impact of the first signal 20 as transmitted by the TX module 210 on the second signal 30 as received by the RX module 220 can be reduced or even completely eliminated.

It is to be understood that the elements of FIG. 2 have been shown for illustrating basic principles of how the full-duplex operation may be implemented, and that in practical implementations further functionalities or modified functionalities may be provided. For example, various algorithms of self-interference cancellation could be applied. Further, the self-interference cancellation could be applied in the digital domain, using digital signal processing, in the analog domain, using analog signal processing, or those in the digital domain and the analogue domain. Moreover, it is to be understood that the full-duplex operation on the same carrier frequency may be combined with various other multiplexing technologies, e.g., frequency division multiplexing, time division multiplexing, code division multiplexing, and/or spatial multiplexing. For example, when using frequency division multiplexing, the full-duplex operation could be applied for each of multiple carrier frequencies. Similarly, in the case of time division multiplexing, the full-duplex operation could be applied in each time slot assigned. Further, in the case of code division multiplexing, the full-duplex operation may be applied with respect to each of multiple codes. Further, in the case of spatial multiplexing, the full-duplex operation may be applied with respect to each of multiple spatial channels. Accordingly, the first signal 20 and the second signal 30 may be transmitted on the same carrier frequency, in the same time slot, using the same code, and on the same spatial channel.

The concepts as illustrated herein aim at considering that the full-duplex operation is typically not possible under all circumstances. Accordingly, it might be impracticable to use the full-duplex operation for all radio communication in the wireless communication system. Thus, in order to efficiently exploit the benefits offered by the full-duplex operation, the illustrated concepts assume that the full-duplex operation is activated or deactivated based on monitoring certain conditions.

For example, in some scenarios the self-interference cancellation module 230 may allow for sufficient cancellation of the first signal 20 from the second signal 30 only if the transmit signal strength (or transmit power) of the first signal 20 is sufficiently small and/or if the received signal strength (or received power as the second signal 30 is sufficiently high. Accordingly, an exemplary condition for activating the full-duplex operation could be based on the transmit signal strength of the first signal 20 being below a threshold, e.g., of 3 dBm. Another exemplary condition for activating the full-duplex operation could be based on the received signal strength of the second signal 30 being above a threshold, e.g., of 3 dBm. In some cases, the monitored condition could also be based on a comparison of the transmit signal strength of the first signal 20 to the received signal strength of the second signal 30, or the transmit signal strength of the first signal 20 could be compared to a threshold which depends on the received signal strength of the second signal 30. Further, the full-duplex operation could be activated depending on a condition which is based on mobility of the involved radio devices relative to each other. For example, performance of self-interference cancellation may degrade in the case of relative motion with high relative velocity, and the full-duplex operation might thus be activated only if the velocity is below a threshold, e.g., of 3 m/s. Relative motion may for example be estimated on the basis of Doppler measurements, on the basis of measurements by motion or positioning sensors, and/or on the basis of tracking mobility events, such as cell changes. Further conditions which may be monitored and applied when deciding whether to activate the full-duplex operation may be based on quality of service requirements, bandwidth requirements, or traffic type. For example, due to limitations of the self-interference cancellation it might not be possible to ensure the same quality of service or bandwidth as in the case of using different carrier frequencies for the signals 20, 30. The full-duplex operation could thus be activated for best-effort traffic with low quality of service requirement and low bandwidth requirement, but not for premium traffic with high quality of service requirement and/or high bandwidth requirement.

The activation of the full-duplex operation may be organized in various ways. According to one aspect, the activation of the full-duplex operation may be subject to network control. For example, in the case of a cellular radio network, the cellular radio network may be in control whether UEs connected to the cellular radio network are allowed to use the full-duplex operation or not. Corresponding control functionalities may be implemented by a base station of the cellular radio network, such as the base station 100, which may control the UEs 10-A, 10-B, and 10-C in a corresponding manner. Such enablement of activation of the full-duplex operation may be signalled on a cell level, e.g., as part of system information (SI) broadcasted to all UEs in the cell served by the base station. However, enablement of activation of the full-duplex operation could also be signalled individually for each UE or with respect to specific groups of UEs. According to one example, enablement of activation of the full-duplex operation could be signalled to the UE when the UE registers in the cell (in idle mode) or when the UE sets up a radio connection to the cell (i.e., when the UE enters active mode).

The network may control the enablement of activation of the full-duplex operation depending on the monitoring of various conditions as outlined above. In some cases, the network may also send an activation command which immediately triggers activation of the full-duplex operation by the UE. In some scenarios, the activation of the full-duplex operation may also be implemented without explicit signalling. For example, the activation of the full-duplex operation could be triggered implicitly by signalling of other control information. An example of such control information which may be applied for implicitly triggering activation of the full duplex operation is scheduling information which assigns radio resources to the UE. Assuming that the network knows that that the UE is capable of using the full-duplex operation (e.g., from capability information signalled by the UE or by deriving corresponding capability information from other information, such as device type, UE category, or the like), activation of the full-duplex operation could be triggered in an implicit manner by scheduling a transmission to the UE to occur at the same time and on the same carrier frequency as a transmission from the UE. For this purpose, for example a corresponding uplink grant and a corresponding downlink assignment could be sent to the UE, e.g., by the base station 100 or some other node responsible for scheduling of radio transmissions. Further, the network may signal consent to activation of the full-duplex operation to the UE(s) and leave the final decision whether to activate the full-duplex operation to the UE(s).

According to a further aspect, the UE may be responsible for deciding whether to activate the full-duplex operation. This may for example be useful in the case of D2D communication of the UE. The UE may monitor one or more conditions associated with an active or to-be initiated D2D communication link, e.g., conditions as outlined above. The network may indicate the condition(s) to be monitored to the UE or otherwise configure parameters associated with the monitoring of the condition(s). Parameters which may be considered in the monitoring may be relative velocity, e.g., based on Doppler measurements or measurements by motion or positioning sensors, transmit signal strength and/or received signal strength, quality of service requirements, bandwidth requirements, or type of traffic to be conveyed on the D2D communication link. In some cases, relaying may be used in connection with D2D communication. For example, the UE 10-A could receive traffic from the base station 100 and really the traffic by D2D communication to the UE 10-B. In such cases, the transmit signal strength and/or received signal strength may be considered both for the relay link to the base station 100 and for the D2D communication link. Monitoring of conditions and activation of the full-duplex operation based on this monitoring may be performed autonomously by the UE, without any interaction with the network, for may require consent of the network to the activation, e.g., in terms of the above-mentioned signalling of enablement. The UE may request consent to the activation from the network upon detecting that conditions for activation of the full-duplex operation are met. Further, signalling of consent to the activation by the network may trigger monitoring of the condition(s) by the UE.

As a matter of course, once the full-duplex operation is activated, the monitoring of the conditions may continue and the full-duplex operation may be deactivated when the conditions are no longer met.

Figure 3:
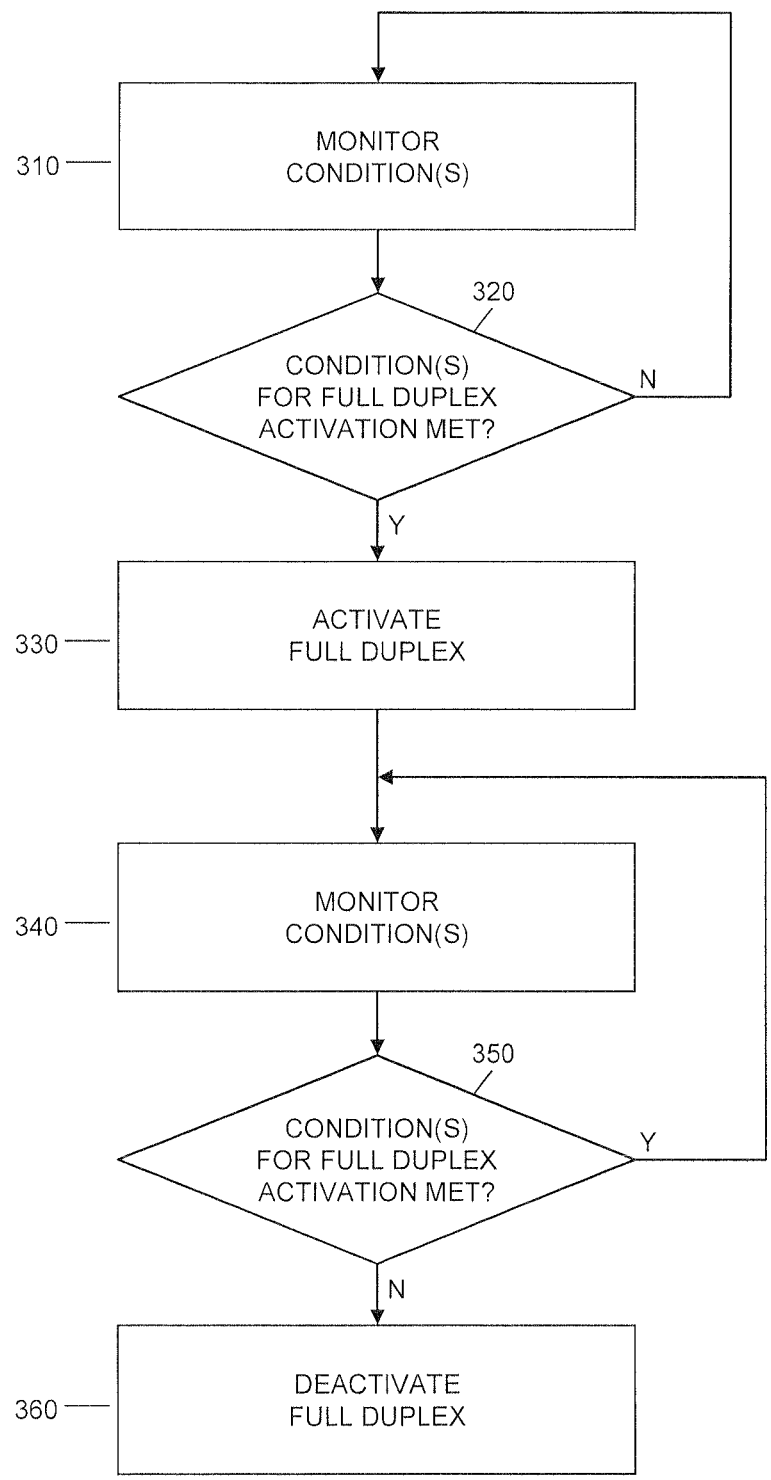
FIG. 3 shows a flowchart for illustrating a method according to an embodiment of the invention.

FIG. 3 shows a flowchart illustrating a method of controlling radio transmission, by which a radio device may implement concepts as described above. The radio device may correspond to a UE with connectivity to a cellular radio network. Alternatively, the radio device may also correspond to a base station of a cellular radio network. In some scenarios, the radio device may also correspond to a radio device supporting D2D communication. For example, the radio device could correspond to a UE with connectivity to a cellular radio network, and the cellular radio network could also at least in part be responsible for managing the D2D communication by the radio device, e.g., by assigning cellular network radio resources to be used for the D2D communication. In some scenarios, the radio device itself may be responsible for managing the D2D communication, e.g., in a stand alone D2D communication scenario without management or other control of D2D communication from a centralized network node. In some scenarios, the radio device may also correspond to a radio device supporting D2D communication. If a processor based implementation of the radio device is utilized, at least a part of the steps of the method may be performed and/or controlled by one or more processors of the radio device. The method may also be implemented by a radio control node responsible for controlling radio communication of the radio device, e.g., by a base station of a cellular radio network. If a processor based implementation of the radio control node is utilized, at least a part of the steps of the method may be performed and/or controlled by one or more processors of the radio control node.

At step 310, at least one condition is monitored. The condition is associated with radio communication of a radio device with a further radio device. The further radio device may correspond to a UE with connectivity to a cellular radio network. Alternatively, the further radio device may also correspond to a base station of a cellular radio network. In some scenarios, the further radio device may also correspond to a radio device supporting D2D communication.

For example, the radio communication may correspond to radio communication of a UE with a base station of a cellular radio network, e.g., to radio communication of one of the UEs 10-A, 10-B, 10-C with the base station 100. Further, the radio communication could also correspond to D2D communication between two UEs, e.g., to the D2D communication of the UE 10-A with the UE 10-B as illustrated in FIG. 1. Such D2D communication may be subject to network control. For example, the D2D communication of the UEs 10-A and 10-B could be managed by the base station 100. However, the D2 D communication could also be controlled and managed by the involved radio devices themselves. For example, at least one of the UEs 10-A and 10-B could manage and/or control the D2D communication of the UEs 10-A and 10-B. This may also be accomplished in a stand-alone manner, without requiring any further control or management from other entities. In the illustrated method, it is assumed that control and management of the radio communication specifically involves activation or deactivation of full-duplex operation.

The full-duplex operation involves transmission of a first signal on a carrier frequency from the radio device to the further radio device and simultaneous transmission of a second signal on the same carrier frequency from the further radio device to the radio device. Examples of such first and second signal are the first signal 20 and the second signal 30 as illustrated in FIG. 2.

The condition(s) monitored at step 310 may be based on at least one of a transmit signal strength of the first signal at the radio device and a transmit signal strength of the second signal at the further radio device. In particular, the condition(s) monitored at step 310 may be based on the transmit signal strength being below a threshold. In this way, it can be taken into account that in the case of a lower transmit signal strength, a better performance of self-interference cancellation for the full-duplex operation can be achieved. The transmit signal strength may be measured by the radio device or the further radio device. Further, the transmit signal strength may be indicated in a measurement report.

In addition or as an alternative, the condition(s) monitored at step 310 may be based on at least one of a received signal strength of the first signal at the radio device and a received signal strength of the second signal at the further radio device. In particular, the condition(s) monitored at step 310 may be based on the received signal strength being above a threshold. In this way, it can be taken into account that in the case of a higher received signal strength, a better performance of self-interference cancellation for the full-duplex operation can be achieved. The received signal strength may be measured by the radio device or the further radio device. Further, the received signal strength may be indicated in a measurement report.

In addition or as an alternative, the condition(s) monitored at step 310 may be based on a distance of the radio device to the further radio device. In particular, the condition(s) monitored at step 310 may be based on the distance being below a threshold. In this way, it can be taken into account that in the case of a lower distance, typically lower transmit power is needed, resulting in lower transmit signal strength of the first signal at the radio device and lower transmit signal strength of the second signal at the further radio device. Further, a lower distance may also result in higher received signal strength of the first signal at the further radio device and in higher received signal strength of the second signal at the radio device. Accordingly, in the case of a lower distance, a better performance of self-interference cancellation for the full-duplex operation can be achieved. The distance may be determined based on measurements performed by the radio device or by the further radio device, e.g., using positioning measurements based on satellite navigation signals and/or based on multi-lateration or multi-angulation measurements. Further, the distance may be indicated in a report.

In addition or as an alternative, the condition(s) monitored at step 310 may be based on a motion of the radio device relative to the further radio device. In particular, the condition(s) monitored at step 310 may be based on the motion being within certain limits. For example, such limits could be defined in terms of a relative velocity of the radio device with respect to the further radio device being below a threshold. The motion could also be classified, e.g., using a classification such as high mobility and low mobility, and optionally one or more intermediate mobility levels. The condition could then be based on the relative motion not exceeding a certain mobility level. In this way, it can be taken into account that in the case of a lower relative mobility, typically more stable conditions can be achieved for the radio communication and, as a result, lower transmit power is needed, resulting in lower transmit signal strength of the first signal at the radio device and lower transmit signal strength of the second signal at the further radio device. Accordingly, in the case of a lower mobility, a better performance of self-interference cancellation for the full-duplex operation can be achieved. The relative motion may be determined based on measurements performed by the radio device or by the further radio device, e.g., using positioning measurements based on satellite navigation signals and/or based on multi-lateration or multi-angulation measurements, using Doppler measurements for estimation of relative velocity, or using measurements based on motion sensors on the radio device or the further radio device, such as accelerometers. Further, the relative motion could also be estimated by tracking mobility events related to the radio device or the further radio device, such as changes between different cells of a cellular radio network. Further, the relative motion or information for assessing the relative motion may be indicated in a report.

In addition or as an alternative, the condition(s) monitored at step 310 may be based on a quality of service requirement for the radio communication of the radio device with the further radio device. In particular, the condition(s) monitored at step 310 may be based on the quality of service requirement not exceeding a certain maximum quality of service requirement. In this way, it can be taken into account that in the case of a lower quality of service requirement, there is typically a higher tolerance with respect to transmission failures, which in turn may allow for using a lower transmit power, which is beneficial for the performance of the self-interference cancellation. Further, a higher tolerance with respect to transmission failures may also allow for using more relaxed requirements with respect to the performance of the self-interference cancellation.

In addition or as an alternative, the condition(s) monitored at step 310 may be based on a traffic type associated with the radio communication of the radio device with the further radio device. In particular, the condition(s) monitored at step 310 may be based on identifying one or more traffic types for which utilization of the full-duplex operation is defined to be appropriate. In this way, it can be taken into account that in the case of some traffic types, e.g., best effort traffic, there may be a higher tolerance with respect to transmission failures, which in turn may allow for using a lower transmit power, which is beneficial for the performance of the self-interference cancellation. Further, a higher tolerance with respect to transmission failures may also allow for using more relaxed requirements with respect to the performance of the self-interference cancellation.

In addition or as an alternative, the condition(s) monitored at step 310 may be based on a bandwidth requirement for the radio communication of the radio device with the further radio device. In particular, the condition(s) monitored at step 310 may be based on the bandwidth requirement not exceeding a certain maximum bandwidth requirement. In this way, it can be taken into account that in the case of a lower bandwidth requirement, more robust radio parameters, e.g., a lower order modulation and coding scheme, may be utilized, and typically also a lower transmit power, which is beneficial for the performance of the self-interference cancellation. Further, more robust radio parameters may also allow for using more relaxed requirements with respect to the performance of the self-interference cancellation.

At step 320, it is checked whether one or more of the conditions monitored at step 310 are met. Here, it is noted that the check of step 320 may involve checking whether a single condition is met. Further, multiple monitored conditions may also be checked in an accumulative manner by requiring that two or more of the monitored conditions are concurrently met.

If none of the monitored conditions are met at step 320, the method may return to step 310 to continue with the monitoring of the condition(s), as indicated by branch "N". Otherwise, if one or more of the monitored conditions are found to be met, the method may proceed to step 330, where the full-duplex operation is activated for the radio communication of the radio device with the further radio device, as indicated by branch "Y".

The monitoring of the condition(s) of step 310, the checking of the monitored condition(s) of step 320, and the activation of the full-duplex operation may be performed by the radio device itself. In this case, activation of the full-duplex operation may involve triggering switching of the radio device to the full-duplex operation. Further, activation of the full-duplex operation may involve that the radio device sends an indication of enablement of the full-duplex operation to the further radio device. This indication may correspond to an activation command, which immediately triggers switching of the further radio device to the full-duplex operation. Alternatively, this indication may merely allow the further radio device to activate the full-duplex operation, e.g., depending on monitoring of one or more conditions by the further radio device. In some scenarios, the indication of enablement may also be signalled implicitly by other control information, such as by scheduling information which configures radio resources to be used for the radio communication. For example, activation of the full-duplex operation may be triggered by sending scheduling information which configures radio resources in such a way that the same carrier is used at the same time for a transmission to the further radio device and a transmission from the further radio device.

The monitoring of the condition(s) of step 310, the checking of the monitored condition(s) of step 320, and the activation of the full-duplex operation may also be performed by a radio control node which is responsible for controlling the radio communication of the radio device, and optionally also of the radio communication of the further radio device, e.g., a base station of a cellular radio network, such as the base station 100. In this case, activation of the full-duplex operation may involve that the radio control node sends an indication of enablement of the full-duplex operation to the radio device. This indication may correspond to an activation command, which immediately triggers switching of the radio device to the full-duplex operation. Alternatively, this indication may merely allow the radio device to activate the full-duplex operation, e.g., depending on monitoring of one or more conditions by the further radio device. In some scenarios, the indication of enablement may also be signalled implicitly by other control information, such as by scheduling information which configures radio resources to be used for the radio communication. For example, activation of the full-duplex operation may be triggered by sending scheduling information which configures radio resources in such a way that the same carrier is used at the same time for a transmission to the radio device and a transmission from the radio device.

As indicated by step 340, in some scenarios the monitoring of the condition(s) may continue after the activation of the full-duplex operation at step 330. Here, it is to be noted that at step 340 the same conditions may be monitored as at step 310, but that it is also possible that the conditions monitored at steps 310 and 340 differ from each other.

At step 350, it is checked whether one or more of the conditions monitored at step 340 are met. Here, it is noted that the check of step 350 may involve checking whether a single condition is met. Further, multiple monitored conditions may also be checked in an accumulative manner by requiring that two or more of the monitored conditions are concurrently met.

If the monitored conditions are met at step 350, the method may return to step 340 to continue with the monitoring of the condition(s), as indicated by branch "Y". Otherwise, if one or more of the monitored conditions are found to be not met, the method may proceed to step 360, where the full-duplex operation is deactivated for the radio communication of the radio device with the further radio device, as indicated by branch "N".

The monitoring of the condition(s) of step 340, the checking of the monitored condition(s) of step 350, and the deactivation of the full-duplex operation may be performed by the radio device itself. In this case, deactivation of the full-duplex operation may involve triggering switching of the radio device from the full-duplex operation to some other operation, e.g., full-duplex operation on different carrier frequencies or half-duplex operation on the same carrier frequency. Further, deactivation of the full-duplex operation may involve that the radio device sends an indication of disablement of the full-duplex operation to the further radio device. This indication may correspond to a deactivation command, which immediately triggers switching of the further radio device from the full-duplex operation to some other operation.

The monitoring of the condition(s) of step 340, the checking of the monitored condition(s) of step 350, and the activation of the full-duplex operation may also be performed by a radio control node which is responsible for controlling the radio communication of the radio device, and optionally also of the radio communication of the further radio device, e.g., a base station of a cellular radio network, such as the base station 100. In this case, activation of the full-duplex operation may involve that the radio control node sends an indication of disablement of the full-duplex operation to the radio device.

This indication may correspond to a deactivation command, which immediately triggers switching of the radio device to the full-duplex operation.

It is noted that the procedures associated with the activation of the full-duplex operation, as described in connection with steps 310, 320, and 330, and the procedures associated with the deactivation of the full-duplex operation, as described in connection with steps 340, 350, and 360, may be performed by the same entity, e.g., both by the radio device or both by the radio control node. However, it is also possible that the procedures associated with the activation of the full-duplex operation and the procedures is associated with the deactivation of the full-duplex operation may be performed by different entities. For example, the procedures associated with the activation of the full-duplex operation could be performed by the radio control node, whereas the procedures associated with the deactivation of the full-duplex operation could be performed by the radio device itself. Similarly, the procedures associated with the activation of the full-duplex operation could be performed by the radio device, whereas the procedures associated with the deactivation of the full-duplex operation could be performed by the radio control node.

Figure 4:
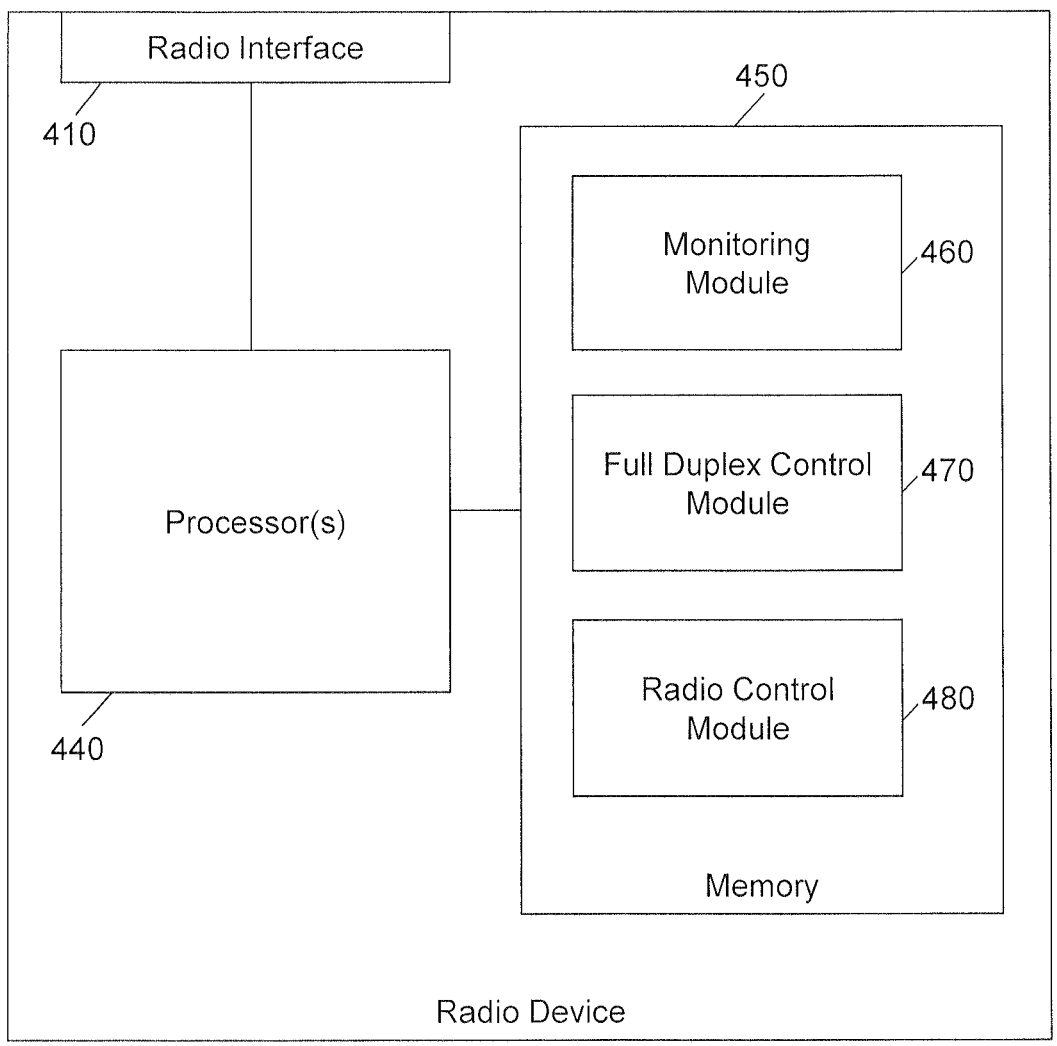
FIG. 4 schematically illustrates a processor-based implementation of a radio device according to an embodiment of the invention.

FIG. 4 shows a block diagram for schematically illustrating a processor based implementation of a radio device, which may be utilized for implementing the above concepts. The radio device may for example correspond to a base station of a cellular radio access technology, e.g., an eNB of the LTE technology, such as the above-mentioned base station 100. Further, the radio device may correspond to a terminal device, such as a UE for connecting to a cellular radio network on a terminal for direct D2D communication. Further, in V2V communication scenarios, the radio device may also correspond to or be part of a vehicle.

As illustrated, the radio device includes a radio interface 410. The radio device may utilize the radio interface 410 for radio communication with a further radio device.

Further, the radio device is provided with one or more processors 440 and a memory 450. The radio interface 410, and the memory 450 are coupled to the processor(s) 440, e.g., using one or more internal bus systems of the radio device.

The memory 450 includes program code modules 460, 470, 480 with program code to be executed by the processor(s) 140. In the illustrated example, these program code modules include a monitoring module 460, a full-duplex control module 470, and a radio control module 480.

The monitoring module 460 may implement the above-described functionalities of monitoring conditions associated with radio communication of the radio device with a further radio device, e.g., as described in connection with steps 310 and 340. The full-duplex control module 470 may implement the above-described functionalities of activating or deactivating the full-duplex operation, e.g., as described in connection with steps 330 and 360. The radio control module 480 may implement the above-described functionalities of controlling radio transmission, e.g., by establishing radio links, selecting radio resources for such radio links, or the like.

It is to be understood that the structures as illustrated in FIG. 4 are merely exemplary and that the radio device may also include other elements which have not been illustrated, e.g., structures or program code modules for implementing known functionalities of a UE or stand-alone D2D communication device, or of a base station, e.g., of an eNB of the LTE radio technology.

Figure 5:
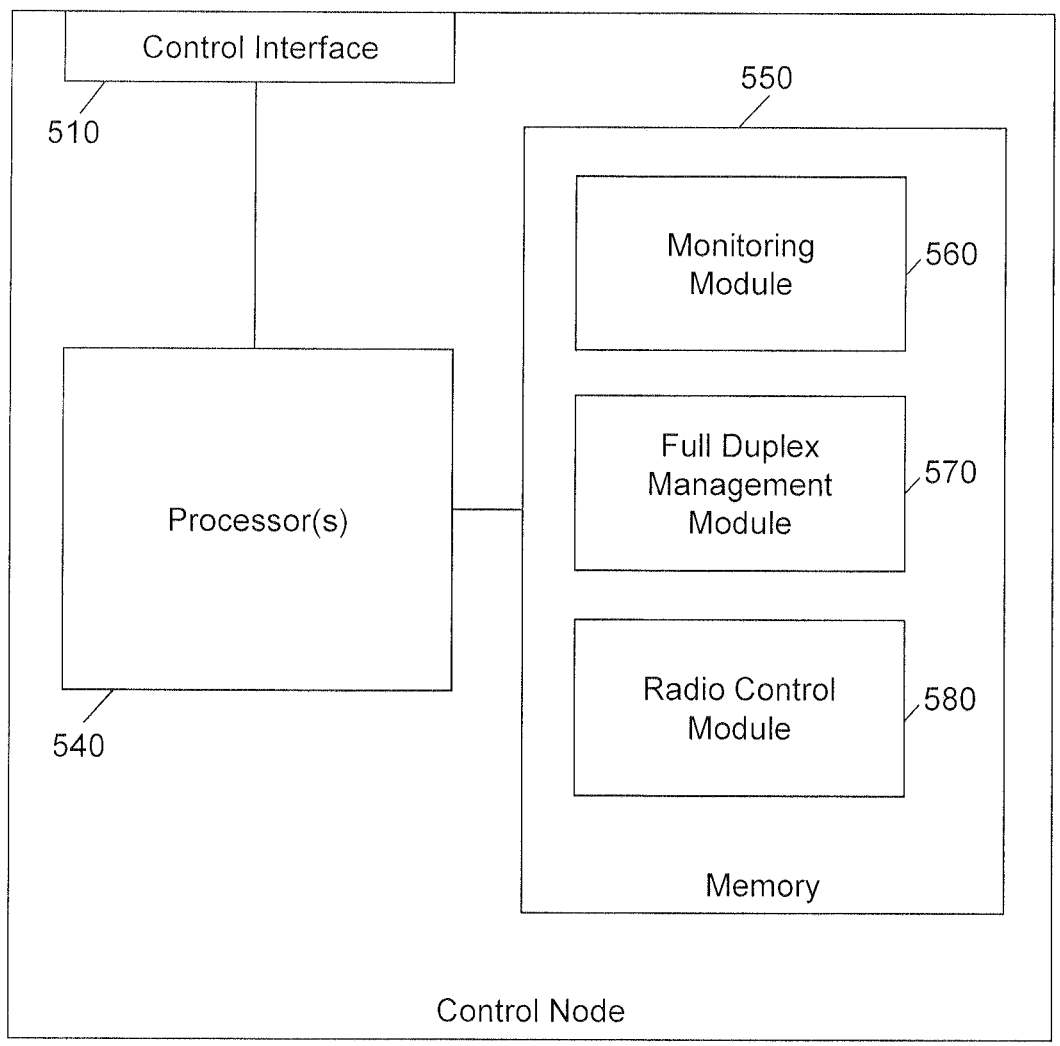
FIG. 5 schematically illustrates a processor-based implementation of a radio control node according to an embodiment of the invention.

FIG. 5 shows a block diagram for schematically illustrating a processor based implementation of a radio control node, which may be utilized for implementing the above concepts. The radio control node may for example correspond to a base station of a cellular radio access technology, e.g., an eNB of the LTE technology, such as the above-mentioned base station 100.

As illustrated, the radio control node includes a control interface 510. The radio control node may utilize the control interface 510 for controlling radio communication of a radio device with a further radio device. The control interface 510 may correspond to a radio interface. However, in some scenarios also a wire-based interfaced could be used for implementing the control interface 510. The radio device and the further radio device may correspond to UEs, such as the UEs 10-A, 10-B, or 10-C.

Further, the radio control node is provided with one or more processors 540 and a memory 550. The control interface 510, and the memory 550 are coupled to the processor(s) 540, e.g., using one or more internal bus systems of the radio control node.

The memory 550 includes program code modules 560, 570, 580 with program code to be executed by the processor(s) 540. In the illustrated example, these program code modules include a monitoring module 460, a full-duplex management module 570, and a radio control module 580.

The monitoring module 560 may implement the above-described functionalities of monitoring conditions associated with radio communication of the radio device with a further radio device, e.g., as described in connection with steps 310 and 340. The full-duplex management module 570 may implement the above-described functionalities of activating or deactivating the full-duplex operation, e.g., as described in connection with steps 330 and 360. The radio control module 580 may implement the above-described functionalities of controlling radio transmission, e.g., by establishing radio links, selecting radio resources for such radio links, or the like.

It is to be understood that the structures as illustrated in FIG. 5 are merely exemplary and that the radio device may also include other elements which have not been illustrated, e.g., structures or program code modules for implementing known functionalities of a base station, e.g., an eNB of the LTE technology, or similar radio control node.

It is to be understood that the concepts as explained above are susceptible to various modifications. For example, the concepts could be applied in connection with various kinds of radio technologies, without limitation to the LTE technology, and that the concepts may be applied with respect to various kinds of radio links, including relay links. Further, it is to be understood that the full-duplex operation may be combined with various kinds of multiplexing mechanisms, including frequency division multiplexing, time division multiplexing, code division multiplexing, and spatial multiplexing.

The invention claimed is:

1. A method of controlling radio communication in a wireless communication system including a base station in communication with first and second mobile radio user equipment (UE) devices, the method comprising:
    monitoring by the first UE device at least one condition associated with direct radio communication between the first UE device and the second UE device; and
    in response to the at least one condition being met, controlling by the first UE device activation of a full-duplex operation for said direct radio communication between the first UE device and the second UE device,
    wherein said full-duplex operation for the direct radio communication between the first UE device and the second UE device comprises transmission of a first signal on a carrier frequency from a transmitter of the first UE device directly to the second UE device and simultaneous receiving of a second signal by a receiver of the first UE device on the same carrier frequency transmitted from the second UE device to the first UE device,
    wherein the at least one condition is based on relative signal characteristics between the transmitter and the receiver.

2. The method according to claim 1,
    wherein the at least one condition is based on at least one of:
    a transmit signal strength of the first signal at the first UE device, and/or
    a transmit signal strength of the second signal at the second UE device.

3. The method according to claim 2,
    wherein the at least one condition is based on the transmit signal strength of the first and/or second signals being below a threshold.

4. The method according to claim 1,
    wherein the at least one condition is based on at least one of:
    a received signal strength of the second signal received at the first UE device, and/or
    a received signal strength of the first signal received at the second UE device.

5. The method according to claim 4,
    wherein the at least one condition is based on one or more of:
    the received signal strength of the second signal received at the first UE device, and/or
    the received signal strength of the first signal received at the second UE device being above a threshold.

6. The method according to claim 1,
    wherein the at least one condition is based on a distance between the first UE device and the second UE device.

7. The method according to claim 6,
    wherein the at least one condition is based on the distance being below a threshold.

8. The method according to claim 1,
wherein the at least one condition is based on a relative motion between the first UE device relative and the second UE device.

9. The method according to claim 1,
wherein the at least one condition is based on a quality of service requirement for said radio communication between the first UE device and the second UE device.

10. The method according to claim 1,
wherein the at least one condition is based on a traffic type associated with said radio communication between the first UE device and the second UE device.

11. The method according to claim 1, wherein the at least one condition is based on a bandwidth requirement associated with said radio communication between the first UE device and the second UE device.

12. The method according to claim 1, further comprising:
in response to the at least one condition not being met, deactivating said full-duplex operation.

13. The method according to claim 1,
wherein at least one of the first UE device or the second UE device comprises a base station of a cellular radio network.

14. The method according to claim 1,
wherein said controlling said activation of the full-duplex operation for said communication between the first UE device and the second UE device comprises sending by the first UE device an indication of enablement of said full-duplex operation for said radio communication to the second UE device.

15. The method according to claim 1,
wherein said monitoring and said controlling the activation of said full-duplex operation between the first UE device and the second UE device is performed by a radio control node responsible for controlling radio communication of the first UE device.

16. The method according to claim 15,
wherein said activating of said full-duplex operation between the first UE device and the second UE device comprises sending by the radio control node an indication of enablement of said full-duplex operation to the first UE device.

17. The method according to claim 15,
wherein the radio control node comprises a base station of a cellular radio network.

18. The method according to claim 1, wherein
the at least one condition is based on a transmit signal strength of the first signal at the first UE being less than a threshold that depends on a received signal strength of the second signal received by the first UE.

19. A mobile radio user equipment (UE) device for use in an associated wireless communication system including a base station and an associated further mobile radio UE device, the mobile radio UE device comprising:
a radio interface for communication with the further UE device; and
one or more processors configured to:
monitor at least one condition associated with direct radio communication between the UE device and the further UE device; and
in response to the at least one condition being met, control activation of a full-duplex operation for said direct radio communication between the UE device and the further UE device,
wherein said full-duplex operation for the direct radio communication between the UE device and the further UE device comprises transmission of a first signal on a carrier frequency from the UE device directly to the further UE device and simultaneous receiving of a second signal by the UE device on the same carrier frequency transmitted from the further UE device to the UE device,
wherein the at least one condition is based on relative signal characteristics between the transmitter and the receiver.

20. The mobile radio UE device according to claim 19, wherein the monitoring the at least one condition associated with the radio communication of the UE device with the further UE device comprises:
monitoring by the UE device at least one of:
at least one of:
a transmit signal strength of the first signal at the UE device, and/or
a transmit signal strength of the second signal at the further UE device;
at least one of:
a received signal strength of the second signal received at the UE device, and/or
a received signal strength of the first signal received at the further Ue device;
one or more of:
the received signal strength of the second signal received at the UE device, and/or
the received signal strength of the first signal received at the further UE device being above a threshold;
a distance between the UE device and the further UE device;
a relative motion between the UE device relative and the further UE device;
a quality of service requirement for said radio communication between the UE device and the further UE device;
a traffic type associated with said radio communication between the UE device and the further UE device; and/or
a bandwidth requirement associated with said radio communication between the UE device and the further UE device.

21. The mobile radio UE device according to claim 19, wherein:
the at least one condition is based on a transmit signal strength of the first signal at the first UE being less than a threshold that depends on a received signal strength of the second signal received by the first UE.

\* \* \* \* \*